US008120511B2

(12) United States Patent
Reichl et al.

(10) Patent No.: US 8,120,511 B2
(45) Date of Patent: Feb. 21, 2012

(54) STAND-ALONE MINIATURIZED COMMUNICATION MODULE

(75) Inventors: Herbert Reichl, Berlin (DE); Jurgen Wolf, Berlin (DE); Klaus Lang, Berlin (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 926 days.

(21) Appl. No.: 12/065,446

(22) PCT Filed: Sep. 1, 2006

(86) PCT No.: PCT/EP2006/065940
§ 371 (c)(1),
(2), (4) Date: Jun. 9, 2008

(87) PCT Pub. No.: WO2007/026026
PCT Pub. Date: Mar. 8, 2007

(65) Prior Publication Data
US 2009/0315736 A1     Dec. 24, 2009

(30) Foreign Application Priority Data

Sep. 1, 2005   (DE) .......................... 10 2005 041 594
Nov. 25, 2005  (DE) .......................... 10 2005 056 330
Mar. 24, 2006  (DE) .......................... 10 2006 013 732

(51) Int. Cl.
*G05F 15/00* (2006.01)
(52) U.S. Cl. .................................. 340/870.07
(58) Field of Classification Search .............. 340/870.07
See application file for complete search history.

(56) References Cited

U.S. PATENT DOCUMENTS

| 5,056,783 | A  | * | 10/1991 | Matcovich et al. ........... 473/453 |
| 5,500,065 | A  | * | 3/1996  | Koch et al. .................... 156/123 |
| 6,157,898 | A  |   | 12/2000 | Marinelli |
| 7,091,863 | B2 | * | 8/2006  | Ravet ......................... 340/572.1 |
| 7,231,180 | B2 | * | 6/2007  | Benson et al. ................ 455/41.2 |

FOREIGN PATENT DOCUMENTS

| DE | 103 38 620 A1 | 3/2005 |
| EP | 1411485 A2    | 4/2004 |
| WO | 03/090411 A1  | 10/2003 |

OTHER PUBLICATIONS

Yolaine Cussac; International Preliminary Report on Patentability; Apr. 8, 2008; The International Bureau of WIPO; 34, chemin des Colombettes, 1211 Geneva 20, Switzerland.

* cited by examiner

*Primary Examiner* — Stephen W Jackson
(74) *Attorney, Agent, or Firm* — Stevens & Showalter LLP

(57) ABSTRACT

A device for continuous measurement of the forces acting upon a movable compressible playable object is provided with at least one transmitter communicating with at least one receiver outside the movable object. The at least one receiver transforms signals received and evaluates them online. The movable compressible playable object, for instance a ball, includes at least one pressure sensor and/or at least one three-dimensional acceleration sensor as well as a converter for transforming signals therefrom to transmit them to the transmitter. A method for the use of this device causes activation of the transmitter in the movable object so that a system is created for the measurement of the forces acting upon such an object wherein the received measuring signals are present in evaluated form, online or offline, to be analyzed. By means of the activation method, the active sensor system is initiated to receive and transmit measuring signals.

45 Claims, 5 Drawing Sheets

Schematic modular structure

Fig. 1e scheme of functional layers

STAND-ALONE MINIATURIZED COMMUNICATION MODULE

BACKGROUND OF THE INVENTION

Sensors for detecting data of measurement objects are used in a variety of applications, wherein the data obtained are subsequently processed and evaluated. For this purpose the sensor signal is usually subjected to suitable signal processing in order to quantitatively determine the desired measure with the required precision. In many applications a direct mechanical connection of a sensor element to an external signal processing device, such as a microprocessor or an analog processing circuit including an amplifier and the like, is not possible or is not desired, if this is associated with an impact on the measurement object or would cause undue effort for installation. For example, for moving measurement objects a wired routing of sensor signals is frequently not possible or is associated with a high degree of complexity. Also, for stationary applications a wire-based acquisition of a sensor signal may cause great efforts and thus result in reduced flexibility, if, for instance, the position of one or more sensors is to be changed.

For this reason, sensor systems are frequently provided with increased functionality, in order to facilitate the connection of the sensors to peripheral evaluation components, for example. In particular a wireless connection of sensor elements to respective evaluation components causes increased complexity in conventional systems, in order to precisely and reliably transmit the sensor data to the peripheral component, thereby requiring large transceivers or point-to-point transmitters for communicating with the sensor element. In this way, the potential application of wirelessly communicating sensor elements is strongly restricted or the influence of the actual measurement or monitoring task must no longer remain negligible.

BRIEF SUMMARY OF THE INVENTION

In view of these problems, it is an object of the present invention to enable a more flexible application of sensors while taking into consideration an increased breadth of constraints of the measurement and monitoring situations.

According to one aspect of the present invention, this object is solved by a stand-alone or autarkic sensor module. The stand-alone sensor module comprises a sensor element configured to output an electric signal depending on a specified measure, a signal processing unit connected to the sensor element, a transceiver unit connected to the signal processing unit for wirelessly transmitting data, and an energy source for at least temporarily operating the sensor module in a stand-alone manner.

Due to this arrangement, a stand-alone device is provided that represents a stand-alone wireless sensor communication module, which allows the detection, processing, storage and transmission and receipt of data detected via at least one integrated sensor as needed. An integrated signal processing unit handles the processing of data that is transmitted to other similar devices or a receiver module by a transceiver unit acting as a wireless communication interface for radio transmission, for example. In this manner a stand-alone operation of the sensor module is ensured for a sufficiently long time period for many applications so that a reliable measurement of the specific measure or the performing of a monitoring task is possible without providing a complex infrastructure.

In a further preferred embodiment the stand-alone sensor module is configured to operate at least in a first operating state and a second different operating state, wherein the first operating state represents an energy saving mode in which at least data transmission by the transceiver unit is disabled or impaired.

In this manner the stand-alone operation may be maintained over a long time period, since in the power saving mode that may be one of a plurality of differently configured power saving modes a significant reduction of energy may be achieved, wherein the transition into the power saving mode may be effected by the module itself and/or by a signal received from the outside. For example, a respective control unit may be provided that monitors the operation of the module and the energy status so as to initiate the transition into the power saving mode depending on the configuration of the control unit. For this purpose the control unit may have implemented therein decision criteria, in which operating state the power saving mode is to be enabled, or, when a plurality of power saving modes are available, which power saving mode is to be enabled. Alternatively or additionally, this decision may be made on the basis of an external control signal that is received via the transceiver unit, for example.

In a further embodiment the stand-alone sensor module is configured to transit from the first operating mode into the second operating mode by initialisation by means of a mechanical and/or an electrical and/or a magnetic and/or an electromagnetic and/or an optical signal.

The second operating mode, which may represent the fully operational state of the module, may thus be invoked by external sources, such as a remote data transmission unit or another sensor module, such that a high degree of controllability from the outside is possible, thereby achieving enhanced flexibility for the application of the module.

In a further embodiment the control unit is configured to effect the transition into the second operating mode by means of a signal output by the sensor element to the signal processing unit.

In this way the sensor element itself may be used for the detection of a situation that requires the fully operational state, which in particular may be highly advantageous for monitoring tasks, since in this case the measurement values will typically not be created in predictable time intervals. In this case a more or less continuous detection of measurement values may occur, which, however, are not transmitted and which may, if desired, be subjected to an energy efficient pre-processing that, however, allows the detection of a respective situation, such as exceeding or falling short of a threshold. Hence, for initialising the second operating mode the integrated sensor itself and, if desired, additional integrated sensor may be used, for example, by detecting vibrations, heat, humidity.

In a further embodiment, the signal processing unit comprises an analog/digital converter that may be integrated in the sensor itself, and a digital signal processing section for processing the signal output by the sensor element. In this manner, efficient software-based signal processing methods may be implemented so that a high degree of modularity may be achieved, since the circuit configuration of the signal processing unit may be used for a plurality of different sensor elements and hence for a plurality of measurement and/or monitoring and/or control tasks, since the adaptation may be accomplished by software. If necessary, in this manner the sensor signal may also be provided in a digital form.

In a further advantageous embodiment, the sensor module has a miniaturized structure realized by microsystem technology and microelectronic technology. By using these advanced manufacturing techniques a very compact configuration of the sensor module may be realized so that for a wide variety of applications attachment to the measurement object is possible, substantially without compromising the functionality of the measurement object. The miniaturization at minimal volume of the inventive sensor module accomplished by the technical realization, thereby accommodating the sensor, the radio interface, the signal processor and passive components, thus allows that the sensor module may be attached to or accommodated in nearly any device and object, wherein also the structure may be brought into an appropriate shape so that compromising the functionality may be efficiently suppressed. That is, due to the fabrication technique the compact miniaturized module may be appropriately adapted depending on the application and the requirements, for instance in the form of a ball, cube, a flexible band and the like. Moreover, due to the realization of the sensor module in a modular manner, which may be accomplished by the above-identified techniques in a very advantageous manner, certain functional elements may be exchanged or replaced depending on the requirements of the application so that for example the sensor element may be replaced with another one, or the energy source may be replaced in an efficient and cost effective manner. The methods and technologies of micro-system technique, microelectronics and micro-mechanics used for the fabrication of the miniaturized module, may be combined in different ways and may be adapted to the requirements of the embodiment of the module or the availability of the respective technology. For example, the sensor module may be fabricated by using the before-described technologies such that newly developed components, such as energy systems, may be integrated without significant effort. For instance, micro-fuel cells may be used instead of more conventionally energy sources, such as batteries, accumulators, and the like, once these cells are available in a cost effective manner.

In a further advantageous embodiment, at least a second sensor element is provided that is connected to the signal processing unit for outputting an electrical signal depending on a second specified measure. Due to the provision of a plurality of sensor elements in the sensor module, in total a more complex overall functionality may be achieved so that, for instance, in specific monitoring tasks at temperature and/or smoke thresholds and/or when vibrations occur an alarm may be triggered.

In further advantageous embodiments, at least some of the electronic components are provided as an integrated circuit. In this way a high degree of compactness may be achieved, in combination with enhanced reliability. In one advantageous embodiment the signal processing unit and at least a part of the transceiver unit are provided in a common integrated circuit. In this manner, the amount of workload during installation of the sensor element with respect to connecting electronic components and the provision of electrical connections may significantly be reduced, wherein at the same time enhanced functionality and reliability is provided at minimal volume. In this case it may be particularly advantageous to perform the signal processing or the signal pre-processing in the sensor module substantially on the basis of software such that a wide class of applications may be covered on the basis of a given circuit configuration, without requiring a re-configuration of the integrated circuit.

In a further advantageous embodiment, the integrated circuit further comprises the sensor element. In this way, the degree of compactness may be further enhanced, wherein at the same time also the reliability of the sensor module may be increased. For example, for measures to be detected by measurement techniques, such as pressure, temperature, acceleration, electric fields, optical measures and the like, microelectronic or micro-mechanical sensor elements are available, which may efficiently be taken into consideration for the circuit concept, so that a small overall installed size may be achieved together with a high degree of reliability.

In a further preferred embodiment, the stand-alone sensor module comprises a carrier for accommodating all functional components, wherein the carrier is configured to enable a mechanically stable attachment to or in a measurement object. The provision of an appropriately designed carrier for accommodating the individual components of the sensor module enhances flexibility for applying the sensor module, since the carrier may be designed with respect to the application so as to provide the required degree of mechanical stability and hence integrity of the module during installation and also during the measurement phase. Due to the miniaturization, the sensor module has substantially no or only a low impact on the functioning of the carrier. In particular, the carrier may be configured to be attached to a moving measurement object. In this way a wide variety of applications may be accessible, in which the compact structure of the sensor module in combination with the provision of an appropriate carrier allows measurements also at small moving objects, substantially without compromising the functionality thereof. In one advantageous embodiment, the sensor module is configured to be attachable to a moving sports article and in particular in or to a ball of ball game. Hence, appropriate data may be obtained and evaluated during application of the sports article, wherein a high degree of flexibility and reduced complexity with respect to peripheral components are provided.

In a further preferred embodiment, the sensor element comprises at least an acceleration sensor. For obtaining meaningful acceleration values, a relatively undisturbed movement of a measurement object is usually required, wherein a high degree of authenticity of the obtained measurement data is accomplished due to the inventive stand-alone sensor module, while a low complexity with respect to peripheral components is required.

In a further advantageous embodiment, the energy source comprises a generator that converts mechanical energy and/or electromagnetic energy received by the sensor module into electric energy for operating the sensor module. In this way the operating time of the sensor module and hence its degree of autarky may be increased by enabling a direct conversion of externally provided energy in the sensor module, without requiring a replacement of energy components, as the case may be. In this case a respective generator in the form of a corresponding miniature spring driven mechanical work or a piezo converter may be provided to store mechanical kinetic energy or to immediately convert this energy into electrical energy, while in other embodiments additionally or alternatively means or components are provided in the generator so as to appropriately convert electric, magnetic or electromagnetic energy and subsequently store the energy in an energy source. For example, an inductive component may be provided in the generator in order to convert energy inductively coupled into the generator into electric energy. In other embodiments, a carrier wave used for signal transmission may be utilized so as to provide a corresponding amount of electric energy for the supply of the sensor module. A respective conversion of mechanical and/or electromagnetic energy may be particularly advantageous, if the sensor module is more or less fully integrated in the respective measurement object, so that directly accessing the sensor module would require a respective effort.

According to a further aspect of the present invention, the object underlying the invention is solved by a sensor module system comprising two or more stand-alone sensor modules as are described in the preceding embodiments or as will be described in embodiments still to be described, wherein each stand-alone sensor module is additionally configured to form a self-organizing network together with the further sensor modules of the sensor module system.

The self-organizing network, which may for instance be implemented on the basis of techniques from the field of radio networks, serves the purpose of exchanging data between individual modules and may also be used for establishing a communication path to an external component. Due to the self-organizing network, a high degree of flexibility for the installation of the sensor module system is obtained, since a varying number of sensor modules may be used, whereby a wide field of applications is provided, for instance for environmental aspects, management of buildings, quality control of production processes and in the food industry, in the machine and equipment monitoring, in medical monitoring applications, recreation and the like. In this case, due to the network structure of the module system data transmission from and to individual sensor modules may be accomplished in an efficient manner without requiring voluminous and complex peripheral components.

In another preferred embodiment, a data receiver is further provided in the sensor module system, which is at least temporarily connected to at least one stand-alone sensor module during operation of the system. Hence, desired sensor data may be read out from the network in an efficient fashion and may be used for further data processing.

In a further preferred embodiment, the transceivers of the individual stand-alone sensor modules are configured to transmit signals via electromagnetic signal transmission channels, wherein at least two different frequency ranges are provided. Due to the usage of different frequency ranges within the system, wherein the transmission channels may be employed for initialization of the sensor modules and for data transmission, an appropriate and hence also selectable temporal design of the sensor data acquisition and transmission is possible, since different frequency ranges may be used, if necessary, so as to ensure a reliable data transmission. Moreover, the provision of different frequency ranges may also allow a selection of the energy required for the transmission, so that energy efficient transmission channels may be selected for the data transmission. For example, the transmission of data between individual sensor modules may be performed with a very low intensity in an appropriate frequency range, while, for instance, the transmission of an external initialization signal, for example from the data receiving unit, may be accomplished in a frequency range that ensures a large transmission range so that each stand-alone sensor module may be initialized from outside when needed.

In a further advantageous embodiment an algorithm is implemented in the stand-alone sensor modules for determining a communication path within the system according to a predetermined criterion. Due to the implemented algorithm an appropriate communication channel may be determined, in which data may be transmitted from one module to the next module and finally to an external source, for instance an external data receiving unit. In this way a reliable data transmission may be realized without a significant effort in terms of peripheral components, since, for example, the reliable connection of only one sensor module in the system to the peripheral component, for instance a data receiving unit, is necessary. Hence, also the communication with an external source may be performed under specifically selected criteria, such as an energy saving and secure data transmission.

In a further preferred embodiment, the given criterion specifies a shortest or an energy optimized communication channel.

According to a further aspect of the present invention, a data acquisition system comprises one or more stand-alone sensor modules as described in the preceding embodiments or as described in subsequent embodiments, wherein the data acquisition system further comprises a data receiver that is configured to wirelessly receive data, related to the specified measure, from the one or more stand-alone sensor modules. As discussed above, due to the miniaturized modular structure, the one or more stand-alone sensor modules may be integrated into other devices and objects that fulfil a specific function without significantly compromising the original function. Thus, the devices and objects obtain an extended functionality and their operational characteristic is enhanced, since respective data may be collected in an efficient manner by the data acquisition system, wherein the data is available for further processing external from the devices and objects by means of the data receiver. This holds particularly true when moving objects, such as golf balls, ping pong balls, tennis balls or other game balls are considered, since the state of the moving objects may be monitored with respect to one or more specified measures, wherein the corresponding measurement data has a high degree of authenticity in view of the functionality of the objects.

In another advantageous embodiment, a data transmission device or a data transceiver device is further provided that is configured to wirelessly transmit data to at least one of the one or more sensor modules. In this manner, for example, control of the sensor module and, if necessary, also an influence on the object may be accomplished in an efficient fashion so that a high degree of flexibility during operation of the data acquisition system is achieved. For instance, initialization signals for initializing an operating status and/or for initializing an energy saving mode may be transmitted via the data transmission device so that the data acquisition system is controllable from outside to a high degree. In other embodiments, the configuration and hence the operational behavior of the stand-alone sensor module may externally be controlled, if necessary, by, for instance, transmitting configuration and control data, which may then cause a respective operating mode of the sensor module. If necessary, software upgrading or generally a change in software may be performed via the data transmission unit, so that a respective upgrade of the operating behavior of the sensor modules may be realized without direct external access.

In an advantageous embodiment the data transmission device is configured to perform data transmission via a different wireless transmission channel compared to the data receiving device. In this way the data transmission to the individual sensor modules may take place, for instance in view of accomplishing a reliable data transmission for all sensor modules at the same time, while the criterion of data transmission as efficient and thus energy saving as possible may be applied during data transmission from the sensor modules to the data receiving unit.

In a further embodiment, a data processing unit is provided that is connected to the data receiver unit so as to process data received in the data receiver unit. In this manner measurement data obtained in the sensor modules, which data were subjected to a signal processing, that may, however, represent a data pre-processing with respect to the actual use of the measurement data, may be transmitted to the data processing unit in an energy saving yet efficient manner, wherein the data processing unit may then perform a respective preparation or representation of the collected measurement data according to its computational resources. For this purpose, for instance, mobile or stationary computers and the like may be used. Preferably, the data processing unit is connected to the data receiver unit via a wireless transmission channel. Thus, a high degree of flexibility and also compatibility with respect to existing network technologies may be established by, for instance, using existing standards for the wireless transmission channel between the data processing unit and the data receiver unit, such as the "Bluetooth" standard.

In a further advantageous embodiment, the data receiver unit is configured to input energy into the one or more sensor modules. In this way the independence of the sensor modules and also their compactness may be improved, since the energy sources provided in the individual sensor modules may be selected to be appropriately small. For example, the transceiver unit may be configured such that at least a part of the energy required for the data transmission may be taken from the input energy. This may be accomplished, for instance, by converting the carrier wave energy during the data transmission or by inductively coupling in energy or by providing an optical beam which may concurrently be used for power supply.

According to another aspect of the present invention, a method for collecting data is provided. The method comprises attaching a measurement module to a measurement object, wherein the measurement module is adapted to the measurement object and does substantially not cause a limitation of the functionality of the measurement object. Moreover, measurement data associated with the measurement object are obtained in the measurement module and the measurement data obtained are processed in the measurement module are then wirelessly transmitted.

As discussed above, a high degree of flexibility for the acquisition of data in particular for moving objects may be accomplished by providing the measurement module in a specific measurement object without significant limitation of its functionality by the local gathering, processing and wireless transmission of the respective measurement data.

In advantageous embodiments obtaining measurement data comprises obtaining measurement data for one or more specific measures by means of one or more sensor elements. Thus, during the data acquisition a respective task may be fulfilled by selecting one or more appropriate sensor elements, that is, for instance, triggering an alarm or a corresponding display when not complying with one or more specified value ranges for one or more specified measures.

In further embodiments the processing of the obtained data may comprise data storage over an increased time interval and/or data filtering and/or determination of a threshold and/or a computational evaluation. In this way, a high degree of flexibility is possible when processing the obtained measurement data in situ so that the amount of data may be significantly reduced during transmission, if necessary, to save energy, since respective results of the data processing that are for instance stored as corresponding results need to be transmitted, if necessary. For example, in typical applications in a monitoring situation, in which one or more measures to be obtained according to measurement techniques are to be monitored with respect to exceeding or falling short of respective thresholds, a respective signal transmission will be initiated only when a corresponding result will actually occur so that the usually more energy saving act of data processing will be maintained while data transmission will occur only on demand. Moreover, the transmission may be realized with the use of power saving actions, since minor or no redundancy is to be added to the data, as the case may be, or greater amounts of data are not to be transmitted, since, if necessary, the required evaluation may have completely be performed in the sensor module.

Advantageously, the processing of the measurement data obtained is accomplished by a analog to digital conversion, which may be integrated in the sensor, followed by a digital signal processing which is implemented in a computer device in the form of software in some advantageous embodiments. In this manner a high degree of flexibility is achieved, since the same hardware configurations may be used for very different data acquisition tasks.

Advantageously, the processing of the measurement data obtained is accomplished by an analog to digital conversion, which may be integrated in the sensor, followed by a digital signal processing which is implemented in a computer device in the form of software in some advantageous embodiments. In this manner a high degree of flexibility is achieved, since the same hardware configurations may be used for very different data acquisition tasks.

By this method, a stand-alone sensor device may be manufactured in a target-oriented manner so that authentic measurement data may be obtained from a measurement object. This measurement data may be further used for the monitoring and/or controlling and/or extending the functionality of respective measurement objects.

The technologies used for the fabrication of the one or more sensor modules preferably comprise the integration of two or more of the components on or in a common circuit substrate so that a high degree of complexity and compactness may be achieved at reduced production costs. In this manner, any measurement objects may be provided with respectively tailored sensor modules in a cost effective fashion, wherein due to the compact, modular and stand-alone structure and operation the effort in terms of peripheral devices remains low.

Advantageously, flexible circuit substrates are used also for the fabrication of the sensor modules. In this manner, the shaping and mechanical integrity during application of the sensor module may be improved and the overall size may be further reduced. Thus, overall sizes of the entire module of less than 5 mm×5 mm×2.5 mm (without energy source) may be realized.

Preferably, for the fabrication of the sensor modules passive circuit components and/or—if necessary—optical components and/or micro-mechanical components are integrated in an individual circuit carrier substrate. This type of fabrication ensures a cost effective manufacturing process and at the same time enhanced compactness and interference immunity.

BRIEF DESCRIPTION OF THE SEVERAL VIEWS OF THE DRAWINGS

Further advantageous embodiments are defined in the appended patent claims and are also derivable from the following detailed description of further specific embodiments. Thereby reference is made to the following drawings, in which:

FIG. 1b depicts the modular structure of the sensor module in printed circuit board technique (PCB) of the embodiment of FIG. 1a;

FIG. 1d schematically shows a block diagram of a sensor module including an acceleration sensor.

DETAILED DESCRIPTION OF THE INVENTION

Figure 1A:
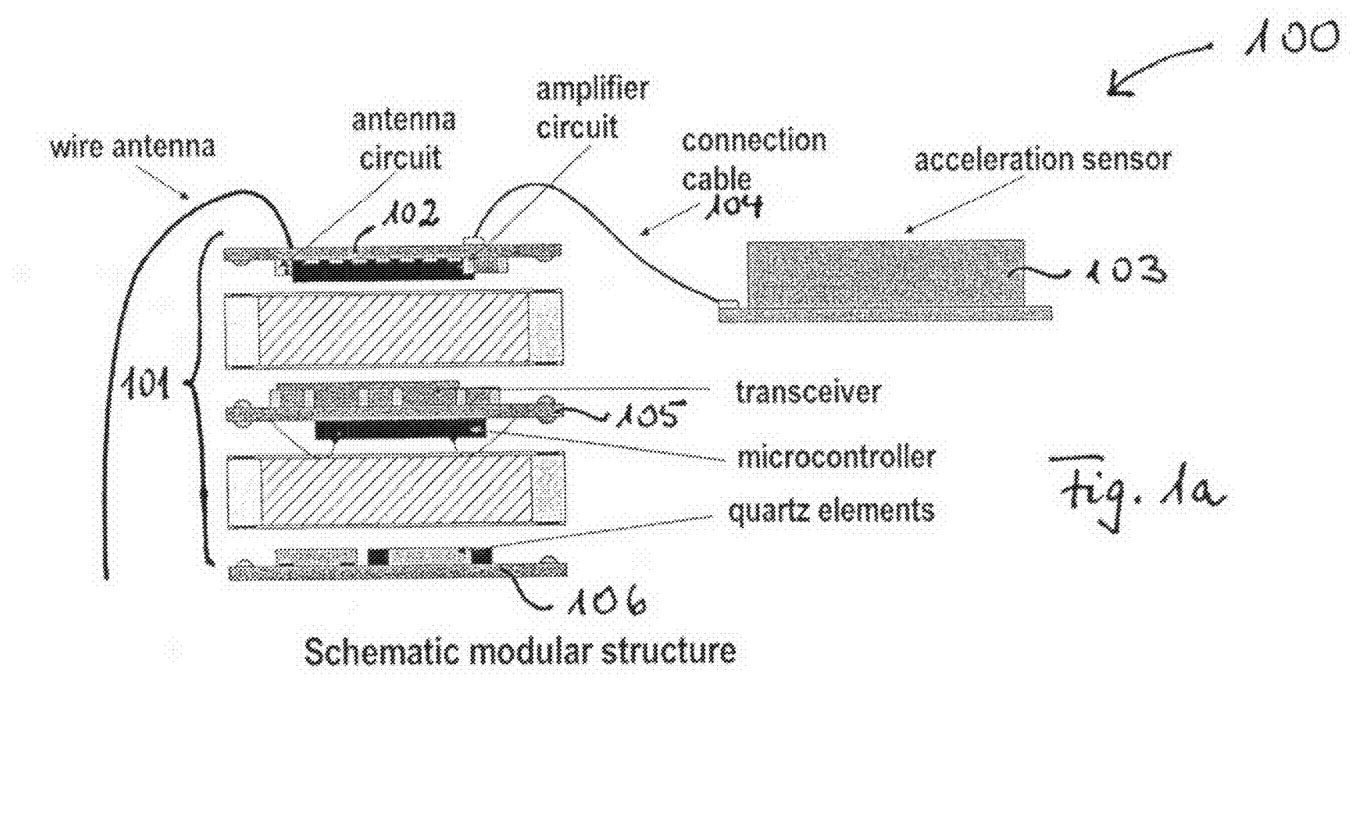
FIG. 1a schematically illustrates a modular structure of a sensor module according to an illustrative embodiment of the present invention.

FIG. 1a schematically illustrates a sensor module 100, which in this illustrative embodiment is provided as a three-dimensional stack of printed wiring boards 101 that, in turn, is divided into different levels. In the embodiment shown, the stack of printed wiring boards 101 comprises in a first level 102, which is generically referred to as signal processing unit, a respective analog and/or digital circuitry, for example an amplifier, an analog-to-digital converter, a digital signal processor and the like, wherein the components of the first level 102 or signal processing unit are connected with a respective sensor element 103. In the embodiment shown the sensor element is provided as an acceleration sensor that is connected via a corresponding connecting cable 104. In other embodiments the sensor element may be mounted on the printed wiring board of the unit 102 or may directly be integrated into the circuit board of the unit 102. Moreover, the printed wiring board of the unit 102 may comprise an appropriate antenna for a transceiver unit 105 that is arranged in the second level in the embodiment shown. In a further level 106 further components may be provided, such as quartz elements or other passive or active components. Furthermore, in this level 106 an energy source (not shown) may be provided or the energy source may be located in a separate level.

Figure 1B:
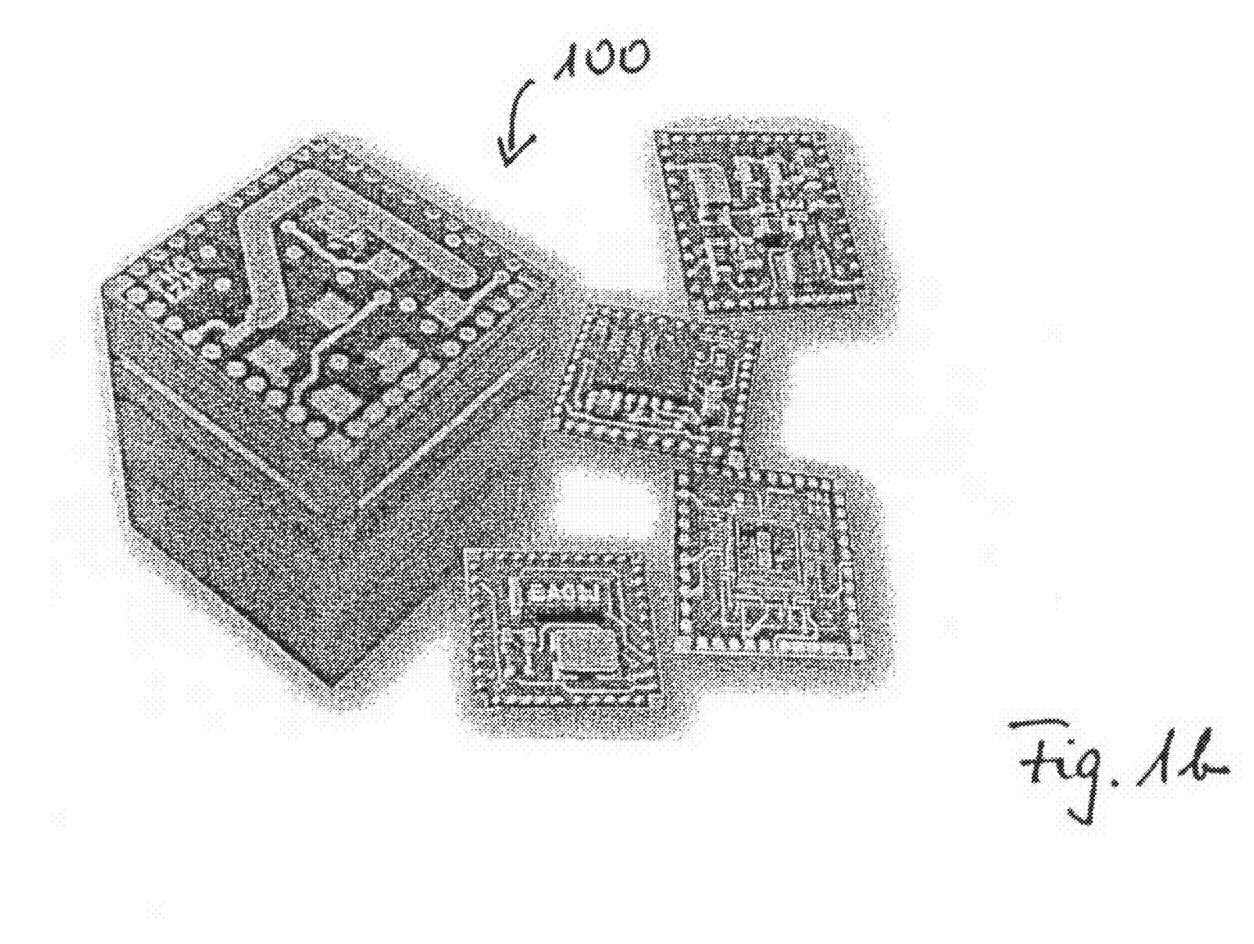

FIG. 1b depicts a perspective view of a further embodiment of the module 100, in which a more compact arrangement is achieved by arranging substantially all electronic components including an antenna device of the transceiver unit 105 on a respective single wiring board, wherein contacting of the single wiring board is realized via corresponding contact pads. It should be appreciated that the number, the shape and the arrangement of the wiring boards is adapted to the application so that the module 100 may be attached to a selected measurement object.

Figure 1C:
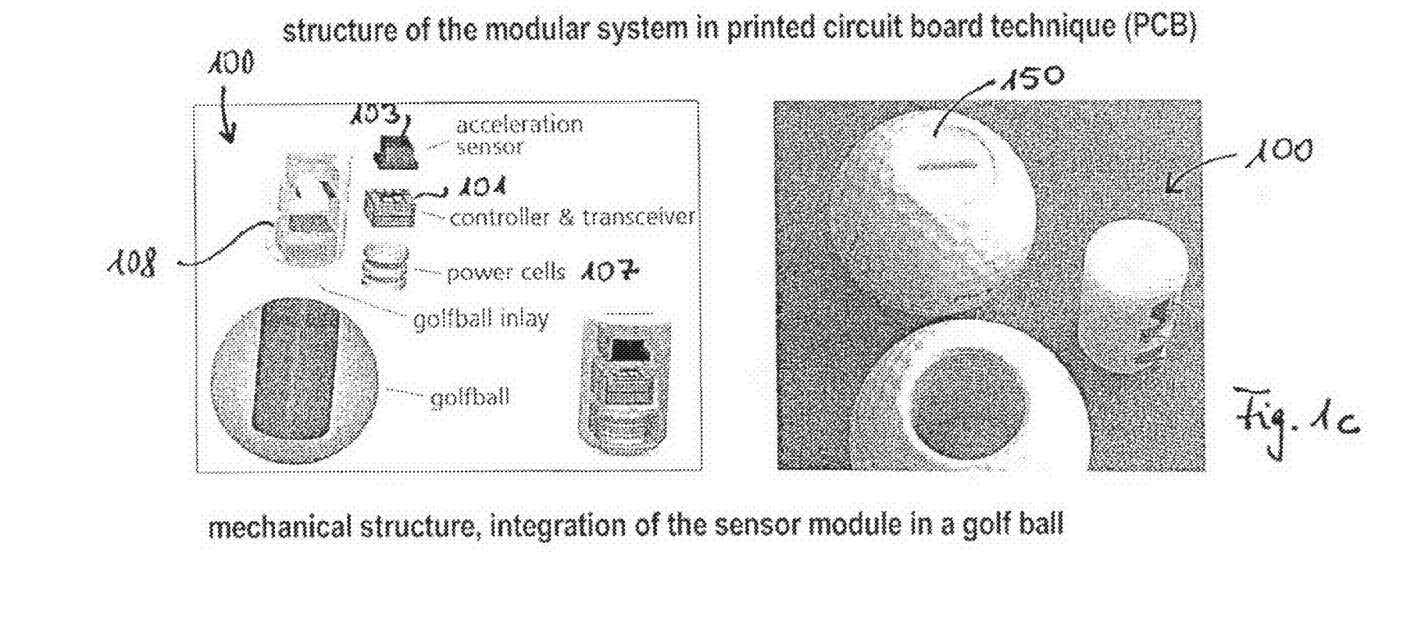
FIG. 1c schematically illustrates the mechanical structure of a specific sensor module for integration into a measurement object that is a golf ball in this example.

FIG. 1c schematically illustrates the sensor module 100 for integration into a measurement object, which in the present embodiment is a golf ball 150. As shown, the sensor module 100 comprises the stack of wiring boards 101, on which is mounted the acceleration sensor 103, wherein below the stack 101 an energy source 107 is provided, for instance in the form of a standard battery or an accumulator in the form of a coin cell. Moreover, a carrier 108 is depicted, in which the individual components, that is, the sensor element 103, the stack of printed wiring boards 101 and the energy source 107, are arranged such that they can be mechanically secured in the golf ball 150 in combination with the carrier 108. On the right hand side of FIG. 1c, the completely mounted sensor module 100 is shown, wherein in this case a respective screw thread is provided on the carrier 108 as a counterpart of a corresponding thread in the golf ball 150 for mechanically securing the module 100 in the golf ball 150.

Mounting of the electronic components for the sensor module 100 is accomplished via established methods of the SMD assembly and "chip on board" (COB) techniques (chip and wire bonding). In this way a compact and light structure is achieved. The carrier 108 is provided in the form of a plastic housing or is made of another suitable material. The assembly of the individual components may be realized by conventional methods of the micro-system technique, depending on the structure, such that an even more compact structure may be achieved. For example, during the fabrication of individual wiring boards a flexible circuit carrier (foil) may be provided, or the integration of passive components may be realized in or on the respective substrate material for the fabrication of integrated circuits or on the substrate material of the printed wiring board.

FIG. 1d schematically illustrates a block circuit diagram of the sensor module 100, wherein the transceiver unit 105 is connected to a data processing unit 102 that is formed of an analog section 102a and a digital section 102b in this embodiment. Moreover, the acceleration sensor 103 is connected with the signal processing unit 102 and the energy source 107 serves for the electrical supply of all components of the module 100. The embodiment shown is of illustrative nature only and may be modified according to the above-discussed principles. For example, in particular the energy source 107 may comprise a corresponding generator (not shown) for conversion of energy that has the above-specified characteristics.

During operation of the module 100 the signal processing unit 102a, 102b may process respective signals of the sensor 103 and supply the same to the transceiver unit 105 for the wireless transmission to other sensor elements or to a respective data receiving unit. In the embodiment shown the digital signal processing unit 102b is provided, which allows a software-based processing such that a high degree of flexibility is achieved for a non-changed hardware configuration. Moreover, in the depicted embodiment of the digital signal processing unit 102b a respective control unit may be implemented, which controls operation of the module 100. For example, in addition to the fully operational mode at least one further operating mode may be implemented in the module 100, in which the energy source 107 may be loaded significantly less, for example by disabling at least that part of the transceiver unit 105 that is responsible for the transmission of data. Furthermore, a plurality of energy saving modes may be provided, as previously explained, so that a corresponding operating mode may be selected depending on the control configurations that may be adjusted by, for instance, external signals.

Figure 1E:
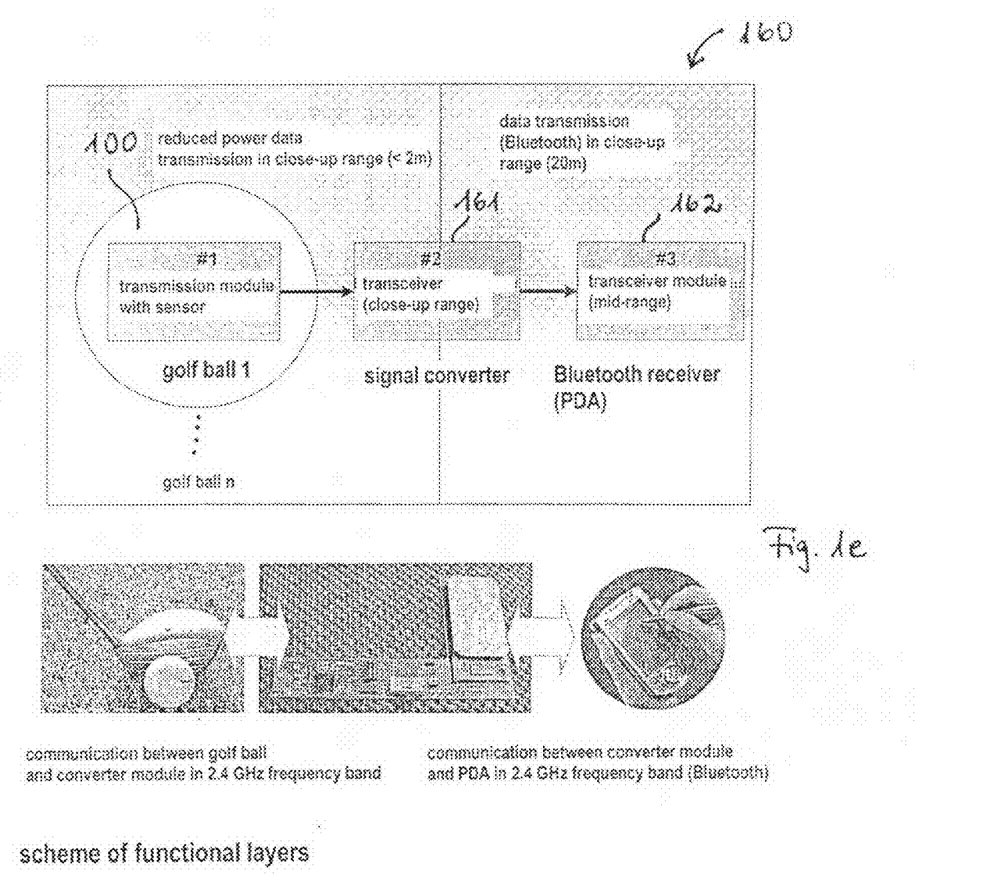
FIG. 1e schematically illustrates a data acquisition system including one or more sensor modules in combination with respective peripheral components according to one illustrative embodiment.
Figure 4:
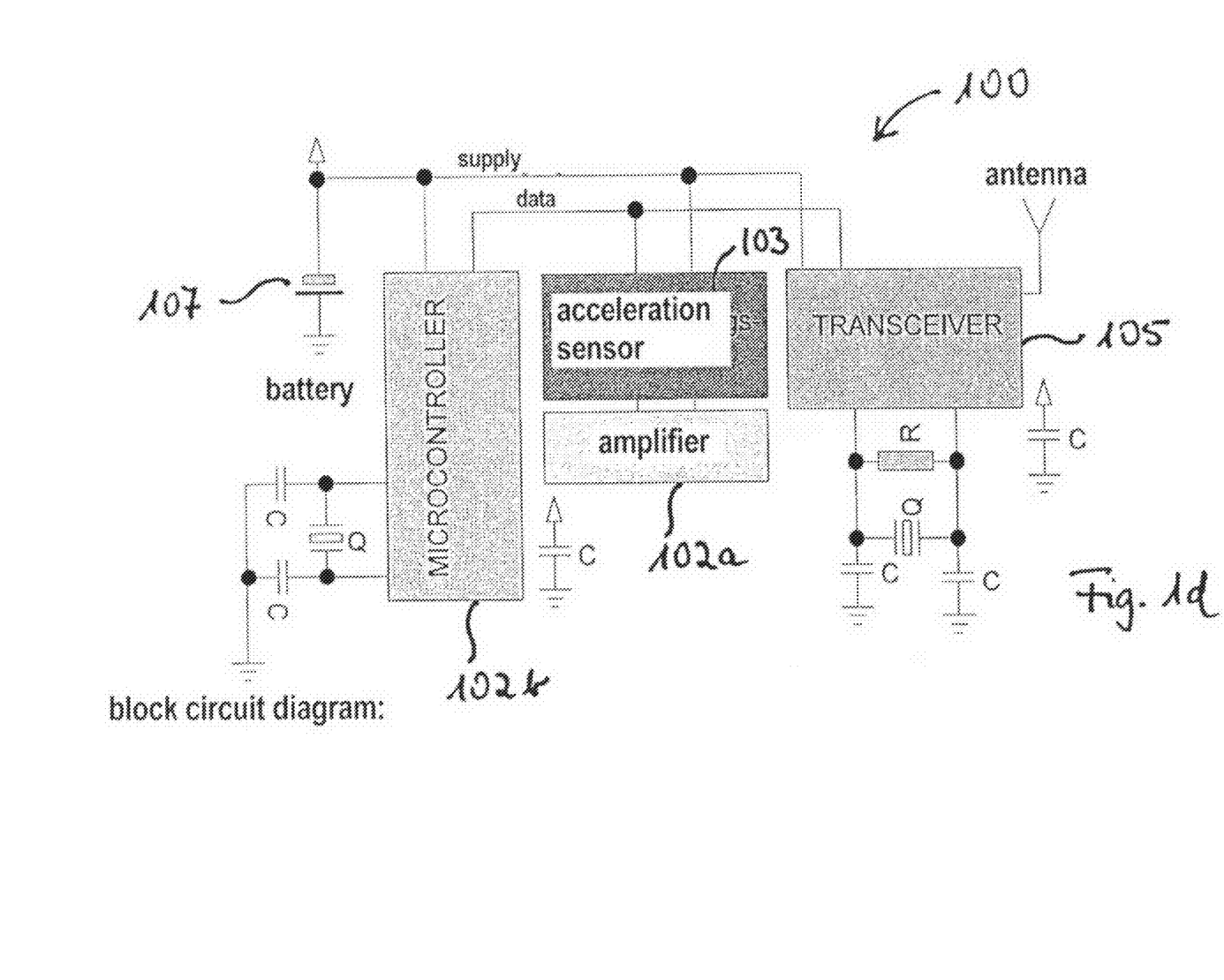

FIG. 1e schematically illustrates a data acquisition system 160, in which one or more sensor modules 100 are provided. Moreover, in the embodiment shown the data acquisition system 160 comprises a data receiving unit 161 that is at least temporarily connected to at least one of the modules 100. Furthermore, a data processing unit 162 is provided in the data acquisition system 160, which in the embodiment shown is referred to as a mid-range transceiver module and which may be used, for instance, for display of the measurement data and for initialising the module 100.

During operation of the system 160, measurement data generated, for instance, by one of the modules 100, for example when hitting the golf ball, i.e., acceleration values may be gathered and may be transmitted to the data receiving unit 161 via electromagnetic transmission channels. In this case, an appropriate frequency range may be used for the transmission channel so that a reliable yet energy saving signal transmission is possible. For example, the data receiving unit 161 may be located in close proximity to the module during the transmission of the measurement data, for example in the corresponding club or at the location of hitting the ball, so that despite the very low transmission power of the module 100 a reliable data transmission is achieved. On the other hand, the data receiving unit 161 may transmit data to the processing unit 162 via a further transmission channel that may differ in its frequency range from the transmission channel used between the module 100 and the data receiving unit 161, so that the corresponding data may be reliably transmitted and appropriately evaluated in the data processing unit 162. For this purpose for instance standard transmission channels, such as the Bluetooth standard, may be used, as are typically available in commercial devices, such as PDAs, mobile phones, mobile computers, and the like. Moreover, via the external data processing unit 162 also an initialisation of the individual modules 100 may be realized by emitting a corresponding signal. For example, prior to hitting the golf ball an initialisation may be performed such that the module 100 transits from energy saving mode to a corresponding operational mode for data acquisition and data transmission.

A plurality of sensor modules 100 may be provided in the data acquisition system 160, which are configured to form a self-organizing network. For example, a plurality of golf balls may be used, which, for instance, store respective measurement data after hitting the balls and subsequently allow a respective data transmission, wherein golf balls being positioned within an area of mutual influence of their transceiver units form a corresponding network structure so as to ensure an efficient data transmission. In this manner, it is possible to supply a high amount of measurement data from different golf balls at a low range of the data receiving unit 161, since, for instance, the data of a remote golf ball may be transmitted to the data receiving unit 161 via an appropriate communication path.

The invention claimed is:

1. A stand-alone sensor module having a miniaturized structure, the dimensions of which being not greater than 1 cm$^3$ and being fabricated by micro-system technology and micro-electronic technology, comprising:
   a sensor element configured to output electrical signals depending on a first specified measure;
   a signal processing unit connected to the sensor element;
   a transceiver unit connected to the signal processing unit, which is capable of wirelessly transmitting data that has been received from the signal processing unit to a data receiving unit and to other stand-alone sensor modules and is further capable of receiving data from a transceiver unit and from other stand-alone sensor modules; and
   an energy source for at least temporary stand-alone operation of the sensor module.

2. The stand-alone sensor module of claim 1, wherein the stand-alone sensor module is configured to adopt at least a first operating mode and a second different operating mode, wherein the first operating mode represents an energy saving mode in which at least data transmission is disabled.

3. The stand-alone sensor module of claim 2, wherein the stand-alone sensor module is configured to transition from the first operating mode into the second operating mode by initialisation via at least one of a mechanical, an electrical, a magnetic, an electromagnetic and an optical signal.

4. The stand-alone sensor module of claim 2, wherein a control unit is provided that is configured to initiate a transition from the first operating mode into the second operating mode.

5. The stand-alone sensor module of claim 4, wherein the control unit is configured to initiate the transition via a signal output by the sensor element to the signal processing unit.

6. The stand-alone sensor module of claim 1, wherein at least one second sensor module is provided that is connected to the signal processing unit for outputting an electrical signal related to a second specified measure.

7. The stand-alone sensor module of claim 1, wherein at least the signal processing unit or the sensor element is provided as an integrated circuit.

8. The stand-alone sensor module of claim 7, wherein the integrated circuit further comprises at least a part of the transceiver unit.

9. The stand-alone sensor module of claim 1, further comprising a carrier for accommodating all of the functional components, wherein the carrier is configured to be mechanically stably attached to a measurement object.

10. The stand-alone sensor module of claim 9, wherein the carrier is configured to be at least one of attached to a moving measurement object and in the moving measurement object.

11. The stand-alone sensor module of claim 10, wherein the measurement object represents a moving sport article.

12. The stand-alone sensor module of claim 1, wherein the sensor element comprises at least an acceleration sensor.

13. The stand-alone sensor module of claim 1, wherein the energy source comprises a generator that is configured to provide electrical energy from at least one of a mechanical energy and an electromagnetic energy acting on the sensor module for maintaining functionality of the sensor module.

14. The stand-alone sensor module of claim 1, wherein dimensions of the stand-alone sensor module are not greater than 0.5 cm$^3$.

15. A sensor module system comprising:
   at least two stand-alone sensor modules, each of the stand-alone sensor modules comprising:
      a sensor element configured to output electrical signals depending on a specified measure;
      a signal processing unit connected to the sensor element;
      a transceiver unit connected to the signal processing unit which is capable of wirelessly transmitting data that has been received from the signal processing unit to a data receiving unit and to other stand-alone sensor modules and is further capable of receiving data from a transceiver unit and from other stand-alone sensor modules; and
      an energy source for at least temporary stand-alone operation of the sensor module;
      wherein each of the stand-alone sensor modules is further configured to form a self-organizing network in combination with at least another of the said stand-alone sensor modules of the sensor module system.

16. The sensor module system of claim 15, further comprising a data receiving unit that is at least temporarily connected to at least one of the stand-alone sensor modules during operation of the system.

17. The sensor module system of claim 15, wherein the transceiver units of the individual stand-alone sensor modules are configured for signal transmission via electromagnetic signal transmission channels, and wherein at least two different frequency ranges are provided, wherein one of the frequency ranges is provided for external initialisation of the sensor modules.

18. A data acquisition system comprising:
   one or more stand-alone sensor modules, each stand-alone sensor module comprising:
      a sensor element configured to output electrical signals depending on a specified measure;
      a signal processing unit connected to the sensor element;
      a transceiver unit connected to the signal processing unit which is capable of wirelessly transmitting data that has been received from the signal processing unit to a data receiving unit and to another stand-alone sensor module and is further capable of receiving data from a transceiver unit and from another stand-alone sensor module; and an energy source for at least temporary stand-alone operation of the sensor module, wherein the data acquisition system further comprises:

a data receiving unit configured to wirelessly receive data associated with the specified measure from the one or more sensor modules.

19. The data acquisition system of claim 18, further comprising a data transmission device that is configured to wirelessly transmit data to at least one of the one or more sensor modules.

20. The data acquisition system of claim 18, wherein the data transmission device is configured to transmit control data serving for configuring the at least one sensor module.

21. The data acquisition system of claim 20, wherein the data transmission device is adapted to a different wireless transmission channel compared to the data receiving unit.

22. The data acquisition system of claim 18, further comprising a data processing unit connected to the data receiving unit so as to process data received by the data receiving unit.

23. The data acquisition system of claim 22, wherein the data processing unit is connected to the data receiving unit via a wireless transmission channel.

24. The data acquisition system of claim 23, wherein the data processing unit is configured to send at least an initialisation signal to the one or more sensor modules.

25. The data acquisition system of claim 18, wherein the transceiver unit of the one or more sensor modules and the data receiving unit are configured for an energy saving data transmission.

26. The data acquisition system of claim 25, wherein the data receiving unit is configured to input energy into the one or more sensor modules.

27. The data acquisition system of claim 26, wherein the transceiver unit is configured to obtain at least a part of the energy required for the data transmission from the input energy.

28. A method of gathering and transmitting data comprising:

securing a sensor module one of on and in a measurement object, wherein the sensor module has a volume of not more than 1 cm$^3$ and does not substantially cause an interference of the functionality of the measurement object;

gathering measurement data in the sensor module, wherein the measurement data are associated with the measurement object;

processing the gathered measurement data in the sensor module; and wirelessly transmitting the processed data from the sensor module, characterized in that at least one further sensor module is provided that is attached to at least one further measurement object and is adapted thereto without substantially causing functional interference of the at least one further measurement object, wherein the at least one further sensor module gathers measurement data of the at least one further measurement object, processes the gathered measurement data and wirelessly transmits the processed measurement data, wherein the sensor module and the at least one further sensor module temporarily exchange data.

29. The method of claim 28, wherein gathering measurement data comprises obtaining measurement values for one or more specified measures via one or more sensor elements.

30. The method of claim 28, wherein an energy saving mode is interim adopted, in which at least the transmission of processed measurement data is discontinued.

31. The method of claim 30, wherein at least gathering of measurement data is discontinued during the energy saving mode.

32. The method of claim 30, wherein the energy saving mode is terminated by an externally supplied initialisation signal.

33. The method of claim 30, wherein the energy saving mode is terminated due to gathered measurement data.

34. The method of claim 28, further comprising supplying energy in a contact-free manner so as to provide at least a part of the energy required to operate the measurement module.

35. The method of claim 34, wherein the contact-free supply of energy is performed during the transmission of data.

36. The method of claim 28, wherein energy for operating the measurement module is obtained from mechanical impact on the measurement object.

37. The method of claim 28, further comprising: receiving data in the sensor module, wherein the received data comprises at least one of control data and measurement data.

38. The method of claim 28, wherein the sensor module and the at least one further sensor module are operated as a self-organizing network.

39. The method of claim 38, further comprising: transmitting processed measurement data of at least one of the sensor module and the at least one further sensor module to a data receiving unit.

40. The method of claim 39, further comprising: creating a communication path with the sensor module and one of the at least one further sensor modules so as to transmit data to the data receiving unit.

41. The method of claim 28, wherein transmission channels of different frequency ranges are available for the transmission of the processed measurement data.

42. The method of claim 28, wherein the measurement object is at least temporarily moved during its use.

43. The method of claim 42, wherein the measurement object is a movable sport device.

44. The stand-alone sensor module of claim 11, wherein the moving sport article is a ball of a ball game.

45. The stand-alone sensor module of claim 14 wherein the dimensions of the stand-alone sensor module are not greater than 0.2 cm$^3$.

* * * * *

UNITED STATES PATENT AND TRADEMARK OFFICE
CERTIFICATE OF CORRECTION

PATENT NO. : 8,120,511 B2  
APPLICATION NO. : 12/065446  
DATED : February 21, 2012  
INVENTOR(S) : Herbert Reichl, Jürgen Wolf and Klaus Lang Page 1 of 1

It is certified that error appears in the above-identified patent and that said Letters Patent is hereby corrected as shown below:

In the Specification:

Col. 8, lines 4-11 should be removed.

Col. 8, immediately following line 19 in the issued patent, the following paragraph should be inserted. --According to another aspect of the present invention, a method for forming a stand-alone sensor module is provided. The method comprises determining a size and a structure of the sensor module for a selected measurement object, wherein the size and the structure do substantially not cause a limitation in functionality of the measurement object upon attaching the sensor module. Moreover, one or more sensor modules are manufactured by using technologies of the microsystem technique and the manufacturing of microstructures, wherein each sensor module includes a plurality of components which comprise a sensor element, a signal processing unit connected to the sensor element, a transceiver unit connected to the signal processing unit for wirelessly transmitting data, and an energy source for an at least temporarily stand-alone operation of the sensor.--

Signed and Sealed this  
Fourth Day of September, 2012

David J. Kappos  
*Director of the United States Patent and Trademark Office*